US011104777B2

(12) United States Patent
Chai et al.

(10) Patent No.: US 11,104,777 B2
(45) Date of Patent: Aug. 31, 2021

(54) INSULATIVE APPARATUS

(71) Applicant: Dow Global Technologies LLC, Midland, MI (US)

(72) Inventors: Ning Chai, San Ramon, CA (US); Jing Chen, Shanghai (CN); Yige Yin, Shanghai (CN); Cheng Chen, Shanghai (CN); Vanni Parenti, Campagnola Emilia (IT)

(73) Assignee: Dow Global Technologies LLC, Midland, MI (US)

( * ) Notice: Subject to any disclaimer, the term of this patent is extended or adjusted under 35 U.S.C. 154(b) by 23 days.

(21) Appl. No.: 16/321,537

(22) PCT Filed: Jul. 29, 2016

(86) PCT No.: PCT/CN2016/092186
§ 371 (c)(1),
(2) Date: Jan. 29, 2019

(87) PCT Pub. No.: WO2018/018571
PCT Pub. Date: Feb. 1, 2018

(65) Prior Publication Data
US 2019/0169393 A1    Jun. 6, 2019

(30) Foreign Application Priority Data

Jul. 29, 2016 (WO) ................ PCT/CN2016/092186

(51) Int. Cl.
*C08J 9/12* (2006.01)
*C08G 18/09* (2006.01)
*C08G 18/18* (2006.01)
*C08G 18/20* (2006.01)
*C08G 18/48* (2006.01)
*C08G 18/76* (2006.01)
*B29C 44/14* (2006.01)
*B29C 44/06* (2006.01)
*B29C 44/12* (2006.01)

(52) U.S. Cl.
CPC .............. *C08J 9/122* (2013.01); *B29C 44/14* (2013.01); *C08G 18/092* (2013.01); *C08G 18/1808* (2013.01); *C08G 18/1816* (2013.01); *C08G 18/2036* (2013.01); *C08G 18/4816* (2013.01); *C08G 18/4829* (2013.01); *C08G 18/7664* (2013.01); *B29C 44/065* (2013.01); *B29C 44/1209* (2013.01); *C08G 2110/0025* (2021.01); *C08G 2115/02* (2021.01); *C08G 2330/50* (2013.01); *C08J 2203/06* (2013.01); *C08J 2203/08* (2013.01); *C08J 2205/044* (2013.01); *C08J 2205/05* (2013.01); *C08J 2375/04* (2013.01)

(58) Field of Classification Search
CPC ............ B29C 44/0415; B29C 44/14–16; C08J 9/122; C08J 2375/00–16; C08J 2203/08
See application file for complete search history.

(56) References Cited

U.S. PATENT DOCUMENTS

| 5,227,245 A | 7/1993 | Brands et al. |
| 9,580,539 B2 | 2/2017 | Kramer et al. |
| 11,001,665 B1* | 5/2021 | Schornstein ........... C08J 9/0061 |
| 2002/0062097 A1* | 5/2002 | Simpson ............ C08G 18/4018 602/46 |
| 2005/0163881 A1* | 7/2005 | Pierick ................ B29C 44/0461 425/4 R |
| 2006/0113694 A1* | 6/2006 | Freser-Wolzenburg ..................... B29C 44/588 264/51 |
| 2008/0064778 A1* | 3/2008 | Hasegawa .......... C08G 18/4879 521/137 |
| 2008/0255262 A1 | 10/2008 | De Vos et al. |
| 2010/0028609 A1 | 2/2010 | Sato et al. |
| 2011/0189465 A1 | 8/2011 | Maurer et al. |
| 2012/0245243 A1 | 9/2012 | Lindner et al. |
| 2013/0115440 A1 | 5/2013 | Hoevel et al. |
| 2014/0346942 A1* | 11/2014 | Kim ..................... F25D 23/064 312/404 |
| 2016/0200889 A1 | 7/2016 | Parenti et al. |
| 2016/0264818 A1* | 9/2016 | Peterson .............. C08G 18/168 |

FOREIGN PATENT DOCUMENTS

| EP | 2314963 | 4/2011 |
| EP | 2806239 A2 | 11/2014 |
| EP | 2806239 A3 | 5/2015 |
| JP | 2001096580 | 4/2001 |
| JP | 2008247026 | 10/2008 |
| WO | 2015067751 | 5/2015 |

OTHER PUBLICATIONS

Kiichiro Matsuzawa, and Masayuki Ochi. "Airborne ultrasound characteristics of open-cell polyurethane foam layers" The Journal of the Acoustical Society of America 68, 212 (1980); doi: 10.1121/1.384625 (Year: 1980).*
Derwent abstract of EP 2806239 (Year: dated 2014).*
International Search Report & Written Opinion for related PCT Application PCT/CN2016/092186, dated Apr. 1, 2017 (12 pgs).

(Continued)

*Primary Examiner* — Michael M Dollinger
*Assistant Examiner* — Christina H. W. Rosebach
(74) *Attorney, Agent, or Firm* — Brooks, Cameron & Huebsch, PLLC

(57) ABSTRACT

Provided are insulative apparatus and methods of forming insulative apparatus. As an example, a method of forming an insulative apparatus can include connecting a barrier material to a mold; injecting a polyurethane foam composition into the mold, wherein the polyurethane foam composition includes a polyol, an isocyanate, and supercritical carbon dioxide; curing the polyurethane foam composition to form a polyurethane foam and applying a vacuum to the mold to provide a pressure from 1 millibar to 500 millibar.

11 Claims, No Drawings

(56) References Cited

OTHER PUBLICATIONS

International Preliminary Report on Patentability for related PCT Application PCT/CN2016/092186, dated Dec. 5, 2018 (8 pgs).

* cited by examiner

INSULATIVE APPARATUS

This application is a National Stage Application under 35 U.S.C. § 371 of International Application Number PCT/CN2016/092186, filed Jul. 29, 2016 and published as WO 2018/018571 on Feb. 1, 2018, the entire contents of which are incorporated herein by reference in its entirety.

FIELD

Embodiments relate to insulative apparatus, more particularly, to insulative apparatus, and methods of forming the same, that are formed from a polyurethane foam composition that includes a polyol, an isocyanate, and supercritical carbon dioxide.

BACKGROUND

Polyurethanes may be used in a variety of applications. Depending upon an application, a particular property of a polyurethane may be desired.

Polyurethane foams are used for a variety of applications. For instance, polyurethane foams can be utilized in the appliance industry, as well as the building industry, among others. For some applications, polyurethane foams may be utilized to provide thermal insulation, among other properties.

SUMMARY

The present disclosure provides methods of forming an insulative apparatus, including: providing a barrier material to a mold; injecting a polyurethane foam composition into the mold, wherein the polyurethane foam composition includes a polyol, an isocyanate, and supercritical carbon dioxide; curing the polyurethane foam composition to form a polyurethane foam; and applying a vacuum to the mold to provide a pressure from 1 millibar to 500 millibar.

The present disclosure provides insulative apparatus including: a mold; a barrier material connected to the mold; and a polyurethane foam inside the mold, wherein the polyurethane foam is formed by injecting a polyurethane foam composition into the mold and curing the polyurethane foam composition, wherein the polyurethane foam composition includes a polyol, an isocyanate, and supercritical carbon dioxide, and wherein a vacuum is applied to the mold to provide pressure from 1 millibar to 500 millibar.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Insulative apparatus and methods of forming insulative apparatus are described herein. As an example, a method of forming an insulative apparatus can include providing a barrier material to a mold; injecting a polyurethane foam composition into the mold, wherein the polyurethane foam composition includes a polyol, an isocyanate, and supercritical carbon dioxide; curing the polyurethane foam composition to form a polyurethane foam; and applying a vacuum to the mold to provide a pressure from 1 millibar to 500 millibar. Advantageously, embodiments of the present disclosure can provide improved thermal conductivity and/or improved manufacturability, as compared to other insulating panels, among other benefits.

Some previous insulating panels that utilize polyurethane foam are manufactured at atmospheric pressures, i.e., the polyurethane foam is in fluid communication with the environment outside of the insulating panel. In other words, a fluid, e.g., air, may pass into and/or out of the insulating panel containing the polyurethane foam. However, these previous insulating panels can have a thermal conductivity of about 18 milliWatts/meter-degree Kelvin [mW/(m·K)] or higher, which may be an undesirable and/or insufficient thermal conductivity for a number of applications.

Some other previous insulating panels that utilize polyurethane foam can be referred to as vacuum insulation panels. Vacuum insulation panels are manufactured at high vacuum, e.g., pressures of less than 1 millibar (mbar), and the polyurethane foam generally has an average pore diameter of 200 micrometers (μm) or greater. Theses vacuum insulation panels are sealed at these pressures such that the polyurethane foam is not in fluid communication with the environment outside of the vacuum insulating panel. In other words, a fluid, e.g., air, may not pass into and/or out of the vacuum insulating panel containing the polyurethane foam. Vacuum insulation panels can have a thermal conductivity of about 5 mW/(m·K) or lower. However, due to the high vacuum associated with the vacuum insulation panels, manufacturing the vacuum insulation panels can require particular equipment and/or specialized manufacturing conditions, which can add to the cost to the vacuum insulation panels and/or time for processing the vacuum insulation panels. Additionally, due to the high vacuum associated with the vacuum insulation panels, the shape of the vacuum insulation panels may be restricted. For instance, it may be difficult or even unrealizable to manufacture irregularly shaped vacuum insulation panels, e.g., panels having sharp protrusions and/or angles within the panel. As such, embodiments of the present disclosure can provide improved manufacturability, as compared to other insulating panels.

As mentioned, insulative apparatus and methods of forming insulative apparatus are described herein. Embodiments of the present disclosure provide an insulative apparatus having a thermal conductivity from 8 mW/(m·K) to 14 mW/(m·K), which may be desirable for a number of applications. All individual values and subranges from 8 mW/(m·K) to 14 mW/(m·K) are included; for example, the insulative apparatus can have a thermal conductivity from a lower limit of 8 mW/(m·K), 8.5 mW/(m·K), 9 mW/(m·K), or 9.5 mW/(m·K) to an upper limit of 14 mW/(m·K), 13.5 mW/(m·K), 13.25 mW/(m·K), or 13 mW/(m·K). This thermal conductivity can be achieved via a synergism of the insulative apparatus components discussed further herein.

Embodiments of the present disclosure provide insulative apparatus that include a polyurethane foam. The polyurethane foam can be formed from a polyurethane foam composition. Polyurethanes are polymers including chains of units joined by carbamate links, which may be referred to as urethane links. Polyurethanes can be formed by reacting isocyanates with polyols in the presence of a blowing agent. As used herein, "polyol" refers to a molecule having an average of greater than 1.0 hydroxyl groups per molecule. Foams are dispersions in which a gas is dispersed in a liquid material, a solid material, and/or a gel material.

Embodiments of the present disclosure provide that the polyurethane foam composition can include a polyol. Various polyols may be utilized. Examples of polyols include, but are not limited to a polyester-polyols, polyether-polyols, and combinations thereof.

Polyester-polyols may be prepared from, for example, organic dicarboxylic acids having from 2 to 12 carbon atoms, including aromatic dicarboxylic acids having from 8 to 12 carbon atoms and polyhydric alcohols, including diols having from 2 to 12 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid, terephthalic acid, and the isomeric naphthalenedicarboxylic acids. The dicarboxylic acids may be used either individually or mixed with one another. Free dicarboxylic acids may be replaced by a corresponding dicarboxylic acid derivative, for example, dicarboxylic esters of alcohols having 1 to 4 carbon atoms or dicarboxylic anhydrides. Some particular examples may utilize dicarboxylic acid mixtures including succinic acid, glutaric acid and adipic acid in ratios of, for instance, from 20 to 35:35 to 50:20 to 32 parts by weight, and adipic acid, and mixtures of phthalic acid and/or phthalic anhydride and adipic acid, mixtures of phthalic acid or phthalic anhydride, isophthalic acid and adipic acid or dicarboxylic acid mixtures of succinic acid, glutaric acid and adipic acid and mixtures of terephthalic acid and adipic acid or dicarboxylic acid mixtures of succinic acid, glutaric acid and adipic acid. Examples of dihydric and polyhydric alcohols are ethanediol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane, among others. Some particular examples provide that ethanediol, diethylene glycol, 1,4-butanediol, 1,5-pentanediol, 1,6-hexanediol or mixtures of at least two of said diols, in particular mixtures of 1,4-butanediol, 1,5-pentanediol and 1,6-hexanediol. Furthermore, polyester-polyols made from lactones, e.g., ε-caprolactone or hydroxycarboxylic acids, e.g., to ω-hydroxycaproic acid and hydrobenzoic acid, may also be employed.

Some embodiments of the present disclosure provide that polyester-polyols may be prepared by polycondensing the organic, e.g., aliphatic and preferably aromatic polycarboxylic acids and mixtures of aromatic and aliphatic polycarboxylic acids, and/or derivatives thereof, and polyhydric alcohols without using a catalyst or in the presence of an esterification catalyst, in an inert gas atmosphere, e.g., nitrogen, carbon monoxide, helium, argon, inter alia, in the melt at from about 150 to about 250° C., at atmospheric pressure or under reduced pressure until a desired acid number, which can be less than 10, and in some instances preferably less than 2, is reached. Some embodiments of the present disclosure provide that the esterification mixture is polycondensed at the above mentioned temperatures under atmospheric pressure and subsequently under a pressure of less than 500 millibar, e.g., from 50 to 150 mbar, until an acid number of from 80 to 30, e.g., from 40 to 30, has been reached. Examples of suitable esterification catalysts include, but are not limited to, iron, cadmium, cobalt, lead, zinc, antimony, magnesium, titanium and tin catalysts in the form of metals, metal oxides or metal salts. Polycondensation may also be carried out in a liquid phase in the presence of diluents and/or entrainers, e.g., benzene, toluene, xylene or chlorobenzene, for removal of the water of condensation by azeotropic distillation, for instance.

Polyester-polyols can be prepared by polycondensing organic polycarboxylic acids and/or derivatives thereof with polyhydric alcohols in a molar ratio of from 1:1 to 1:1.8, e.g., from 1:1.05 to 1:1.2, for instance.

Also, anionic polymerization may be utilized. For instance, alkali metal hydroxides such as sodium hydroxide or potassium hydroxide, or alkali metal alkoxides, such as sodium methoxide, sodium ethoxide, potassium ethoxide or potassium isopropoxide as catalyst and with addition of at least one initiator molecule containing from 2 to 8 reactive hydrogen atoms in bound form or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety may be utilized.

Examples of suitable alkylene oxides include, but are not limited to, tetrahydrofuran, 1,3-propylene oxide, 1,2- and 2,3-butylene oxide, styrene oxide and preferably ethylene oxide and 1,2-propylene oxide. The alkylene oxides may be used individually, alternatively one after the other, or as mixtures. Examples of suitable initiator molecules include, but are not limited to, water, organic dicarboxylic acids such as succinic acid, adipic acid, phthalic acid and terephthalic acid, and a variety of amines, including but not limited to aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, diethylenetriamine, triethylenetetramine, 1,3-propylene-diamine, 1,3- and 1,4-butylene diamine, 1,2-, 1,3-, 1,4-, 1,5- and 1,6-hexamethylenediamine, aniline, cyclohexanediamine, phenylenediamines, 2,3-, 2,4-, 3,4- and 2,6-tolylenediamine and 4,4'-, 2,4'- and 2,2'-diaminodiphenylmethane. Other suitable initiator molecules include alkanolamines, e.g., ethanolamine, N-methyl- and N-ethylethanolamine, dialkanolamines, e.g., diethanolamine, N-methyl- and N-ethyldiethanolamine, and trialkanolamines, e.g., triethanolamine, and ammonia, and polyhydric alcohols, in particular dihydric and/or trihydric alcohols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose, polyhydric phenols, for example, 4,4'-dihydroxydiphenylmethane and 4,4'-dihydroxy-2,2-diphenylpropane, resols, for example, oligomeric products of the condensation of phenol and formaldehyde, and Mannich condensates of phenols, formaldehyde and dialkanolamines, and melamine.

One or more embodiments of the present disclosure provide that the polyol can include polyether-polyols prepared by anionic polyaddition of at least one alkylene oxide, e.g., ethylene oxide or 1,2-propylene oxide or 1,2-propylene oxide and ethylene oxide, onto, as initiator molecule, at least one aromatic compound containing at least two reactive hydrogen atoms and containing at least one hydroxyl, amino and/or carboxyl group. Examples of initiator molecules include aromatic polycarboxylic acids, for example, hemimellitic acid, trimellitic acid, trimesic acid and preferably phthalic acid, isophthalic acid and terephthalic acid, or mixtures of at least two polycarboxylic acids, hydroxycarboxylic acids, for example, salicylic acid, p- and m-hydroxybenzoic acid and gallic acid, aminocarboxylic acids, for example, anthranilic acid, m- and p-aminobenzoic acid, polyphenols, for example, resorcinol, and according to one or more embodiments of the present disclosure, dihydroxydiphenylmethanes and dihydroxy-2,2-diphenylpropanes, Mannich condensates of phenols, formaldehyde and dialkanolamines, preferably diethanolamine, and aromatic polyamines, for example, 1,2-, 1,3- and 1,4-phenylenediamine, e.g., 2,3-, 2,4-, 3,4- and 2,6-tolylenediamine, 4,4'-, 2,4'- and 2,2'-diaminodiphenylmethane, polyphenyl-polymethylene-polyamines, mixtures of diaminodiphenylmethanes and polyphenyl-polymethylene-polyamines, as formed, for example, by condensation of aniline with formaldehyde, and mixtures of at least two polyamines.

Examples of hydroxyl-containing polyacetals include compounds which may be prepared from glycols, such as diethylene glycol, triethylene glycol, 4,4'-dihydroxyethoxy-diphenyldimethylmethane, hexanediol and formaldehyde. Suitable polyacetals can also be prepared by polymerizing cyclic acetals.

Examples of hydroxyl-containing polycarbonates can be prepared, for example, by reacting diols, such as 1,3-propanediol, 1,4-butanediol and/or 1,6-hexanediol, diethylene glycol, triethylene glycol or tetraethylene glycol, with diaryl carbonates, e.g., diphenyl carbonate, or phosgene.

As discussed herein, the polyol may be referred to as a formulated polyol. A formulated polyol may be a mixture, e.g., a blend, of a number of polyols and/or additives discussed herein. For example, a formulated polyol can include a number of blowing agents, catalysts, fillers, flame retardants, chain extenders or cross-linkers, colorants and/or combinations thereof, among others.

Examples of commercially available polyols include, but are not limited to, polyols sold under the trade name VORANOL™, TERCAROL™, and VORATEC™, among others. Embodiments of the present disclosure provide that the polyurethane foam composition can include an isocyanate. Various isocyantaes, e.g., polyisocyantes, may be utilized. As used herein, "polyisocyanate" refers to a molecule having an average of greater than 1.0 isocyanate groups per molecule, e.g. an average functionality of greater than 1.0. A number of embodiments of the present disclosure provide that the isocyanate can have a functionality of 3 or greater.

The polyisocyanate can include an aliphatic polyisocyanate, a cycloaliphatic polyisocyanate, an araliphatic polyisocyanate, an aromatic polyisocyanate, or combinations thereof. Examples of polyisocyanates include, but are not limited to, alkylene diisocyanates such as 1,12-dodecane diisocyanate; 2-ethyltetramethylene 1,4-diisocyanate; 2-methyl-pentamethylene 1,5-diisocyanate; 2-ethyl-2-butyl-pentamethylene 1,5-diisocyanate; tetramethylene 1,4-diisocyanate; and hexamethylene 1,6-diisocyanate. Examples of polyisocyanates include, but are not limited to cycloaliphatic diisocyanates, such as cyclohexane 1,3- and 1,4-diisocyanate and mixtures of these isomers; 1-isocyanato-3,3,5-trimethyl-5-isocyanato-methylcyclohexane; 2,4- and 2,6-hexahydrotolylene diisocyanate; and the corresponding isomer mixtures, 4,4-, 2,2'- and 2,4'-dicyclohexylmethane diisocyanate; and corresponding isomer mixtures. Examples of polyisocyanates include, but are not limited to, araliphatic diisocyanates, such as 1,4-xylylene diisocyanate and xylylene diisocyanate isomer mixtures. Examples of polyisocyanates include, but are not limited to, aromatic polyisocyanates, e.g., 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI), and mixtures of crude MDI and tolylene diisocyanates. The polyisocyanate may be employed individually or as combinations thereof.

One or more embodiments of the present disclosure provide that a modified polyisocyanate may be used utilized. Examples of modified polyisocyanates include, but are not limited, to ester-, urea-, biuret-, allophanate-, uretoneimine-, carbodiimide-, isocyanurate-, uretdione- and/or urethane-containing polyisocyanates. Examples include 4,4'-diphenylmethane diisocyanate, 4,4'- and 2,4'-diphenylmethane diisocyanate mixtures, or crude MDI or 2,4- or 2,6-tolylene diisocyanate, in each case modified by low molecular weight diols, triols, dialkylene glycols, trialkylene glycols or polyoxyalkylene glycols having molecular weight of up to about 6,000. Specific examples of di- and polyoxyalkylene glycols, which may be employed individually or as mixtures, include diethylene, dipropylene, polyoxyethylene, polyoxypropylene and polyoxy-propylene-polyoxyethylene glycols, triols and/or tetrols. NCO-containing prepolymers containing from 25 to 3.5 percent by weight, e.g., from 21 to 14 percent by weight, of NCO, based on the total weight, and prepared from the polyester- and/or preferably polyether-polyols described herein, and 4,4'-diphenylmethane diisocyanate, mixtures of 2,4'- and 4,4'-diphenylmethane diisocyanate, 2,4- and/or 2,6-tolylene diisocyanates or crude MDI are also suitable. Furthermore, liquid polyisocyanates containing carbodiimide groups and/or isocyanurate rings and containing from 33.6 to 15 percent by weight, e.g., from 31 to 21 percent by weight, of NCO, based on the total weight, e.g., based on 4,4'-, 2,4'- and/or 2,2'-diphenylmethane diisocyanate and/or 2,4' and/or 2,6-tolylene diisocyanate, may also be utilized. Modified polyisocyanates may be mixed with one another or with unmodified organic polyisocyanates, e.g., 2,4'- or 4,4'-diphenylmethane diisocyanate, crude MDI, and/or 2,4- and/or 2,6-tolylene diisocyanate. A number of embodiments of the present disclosure provide that the isocyanate includes a polymeric isocyanate, such as isocyanic acid polymethylenepolyphenylene ester (PMDI), among others.

The polyisocyanate may be prepared, e.g., by a known process. For instance, the polyisocyanate can be prepared by phosgenation of corresponding polyamines with formation of polycarbamoyl chlorides and thermolysis thereof to provide the polyisocyanate and hydrogen chloride, or by a phosgene-free process, such as by reacting the corresponding polyamines with urea and alcohol to give polycarbamates, and thermolysis thereof to give the polyisocyanate and alcohol, for example.

The polyisocyanate may be obtained commercially. Examples of commercial polyisocyanates include, but are not limited to, polyisocyanates sold under the trade names PAPI™ and VORATEC™, such as VORATEC™ SD100, a polymeric methylene diphenyl diisocyanate (MDI) available from The Dow Chemical Company, among others.

Embodiments of the present disclosure provide that the polyurethane foam composition can have an isocyanate index from 70 to 500. All individual values and subranges from 70 to 500 are included; for example, the polyurethane foam composition can have an isocyanate index from a lower limit of 70, 80, 90, or 100 to an upper limit of 500, 250, 150, or 130.

Embodiments of the present disclosure provide that the polyurethane foam composition includes supercritical carbon dioxide. The supercritical carbon dioxide, which may be referred to as a blowing agent, may be utilized to help foam formation of the polyurethane foam composition. Advantageously, utilizing the supercritical carbon dioxide can help provide that the polyurethane foam has a number of desirable properties, as discussed further herein, which may help to provide the thermal conductivity discussed herein.

The supercritical carbon dioxide can be from 2 to 25 parts by weight of the polyurethane foam composition, based on 100 parts of the polyol utilized. All individual values and subranges from 2 to 25 parts by weight are included; for example, the supercritical carbon dioxide can be from a lower limit of 2, 5, or 8 parts by weight to an upper limit of 25, 23, or 20 parts by weight based on 100 parts of the polyol utilized.

One or more embodiments of the present disclosure provide that the polyurethane foam composition can include a surfactant. As used herein, a surfactant may also be utilized as a cell opener. Examples of surfactants include silicon-based compounds such as silicone oils and organosilicone-polyether copolymers, such as polydimethyl siloxane and polydimethylsiloxane-polyoxyalkylene block copolymers, e.g., polyether modified polydimethyl siloxane, and combinations thereof. Examples of surfactants include silica particles and silica aerogel powders, as well as organic surfactants such as nonylphenol ethoxylates and VORASURF™ 504, which is an ethylene oxide/butylene oxide block copolymer having a relatively high molecular weight, and combinations thereof, among others. Surfactants are available commercially and include those available under trade names such as DABCO™, NIAX™, and TEGOSTAB™, among others. Commercially available surfactants include those available from Dearmate and Momentive, among other suppliers. One or more embodiments of the present disclosure provide that the surfactant, when utilized, is from 0.1 percent to 10 percent of a total weight of the polyol utilized. All individual values and subranges from 0.1 percent to 10 percent are included; for example, the surfactant can be from a lower limit of 0.1, 0.2, or 0.3 percent to an upper limit of 10, 8.5, or 6.0 percent of a total weight of the polyol utilized.

One or more embodiments of the present disclosure provides that the polyurethane foam composition can include a catalyst, e.g., a blowing catalyst, a gel catalyst, a trimerization catalyst, or a combination thereof, among others. A used herein, blowing catalysts and gel catalysts, may be differentiated by a tendency to favor either the urea (blow) reaction, in the case of the blowing catalyst, or the urethane (gel) reaction, in the case of the gel catalyst. A trimerization catalyst may be utilized to promote reactivity of the polyurethane foam composition.

Examples of blowing catalysts, e.g., catalyst that can tend to favor the blow reaction include, but are not limited to, short chain tertiary amines or tertiary amines containing an oxygen. For instance, blowing catalysts include bis-(2-dimethylaminoethyl)ether; pentamethyldiethylene-triamine, triethylamine, tributyl amine, N,N-dimethylaminopropylamine, dimethylethanolamine, N,N,N',N'-tetra-methylethylenediamine, and combinations thereof, among others.

Examples of gel catalysts, e.g., catalyst that can tend to favor the gel reaction, include, but are not limited to, organometallic compounds, cyclic tertiary amines and/or long chain amines, e.g., that contain several nitrogen atoms, and combinations thereof. Organometallic compounds include organotin compounds, such as tin(II) salts of organic carboxylic acids, e.g., tin(II) diacetate, tin(II) dioctanoate, tin(II) diethylhexanoate, and tin(II) dilaurate, and dialkyltin (IV) salts of organic carboxylic acids, e.g., dibutyltin diacetate, dibutyltin dilaurate, dibutyltin maleate and dioctyltin diacetate. Bismuth salts of organic carboxylic acids may also be utilized as the gel catalyst, such as, for example, bismuth octanoate. Cyclic tertiary amines and/or long chain amines include dimethylbenzylamine, N,N,N',N'-tetramethylbutanediamine, dimethylcyclohexylamine, triethylenediamine, and combinations thereof, and combinations thereof.

Examples of trimerization catalysts include tris(dialkylaminoalkyl)-s-hexahydrotriazines, such as 1,3,5-tris(N,N-dimethylaminopropyl)-s-hexahydrotriazine; [2,4,6-Tris (dimethylaminomethyl) phenol]; potassium acetate, potassium octoate; tetraalkylammonium hydroxides such as tetramethylammonium hydroxide; alkali metal hydroxides such as sodium hydroxide; alkali metal alkoxides such as sodium methoxide and potassium isopropoxide; and alkali metal salts of long-chain fatty acids having 10 to 20 carbon atoms and, combinations thereof. Some commercially available trimerization catalysts include DABCO® TMR-30, DABCO® K 2097; DABCO® K15, POLYCAT® 5, POLYCAT® 8, POLYCAT® 41, POLYCAT® 43, POLYCAT® 46, DABCO® TMR, CURITHANE 52, among others.

The catalyst can be utilized from 0.5 percent to 5.0 percent of a total weight of the polyol utilized. All individual values and subranges from 0.5 percent to 5.0 percent are included; for example, the catalyst can be from a lower limit of 0.5, 0.6, or 0.7 percent to an upper limit of 5.0, 4.0, or 3.0 percent of the total weight of the polyol utilized.

One or more embodiments of the present disclosure provide that the polyurethane foam composition can include one or more additional components. Different additional components and/or different amounts of the additional components may be utilized for various applications. Examples of additional components include pigments, colorants, flame retardants, crosslinkers, chain extenders, antioxidants, bio-retardant agents, and combinations thereof, among others. One or more embodiments of the present disclosure provide that the polyurethane foam composition can include an opacifer. An example of an opacifer is carbon black.

As mentioned, the polyurethane foam composition can be injected into the mold, e.g., a cavity. Embodiments of the present disclosure provide that the mold may have various shapes and/or sizes. One or more embodiments of the present disclosure provide that the mold is suitable for refrigeration applications, e.g., insulation. Advantageously, the mold may be irregularly shaped and/or have a number of sharp protrusions and/or angles within the mold, in contrast to vacuum insulation panels.

Embodiments of the present disclosure include a barrier material. The barrier material can help reduce flow of a fluid into and/or out of the mold, e.g., after the polyurethane foam has cured within the mold. The barrier material can be sealed to help maintain a desired pressure within the mold, as discussed further herein. The barrier material can have an oxygen transmission rate from 1e-20 $m^3$ m/($m^2$ Pa day) to 1e-12_$m^3$ m/($m^2$ Pa day). All individual values and subranges from 1e-20 $m^3$ m/($m^2$ Pa day) to 1e-12_$m^3$ m/($m^2$ Pa day) are included; for example, the barrier material can have an oxygen transmission rate from an upper limit of 1e-12, 1e-13, or 1e-14 $m^3$ m/($m^2$ Pa day) to a lower limit of 1e-20, 1e-19, or 1e-18 $m^3$ m/($m^2$ Pa day).

In addition, the barrier material can have a water vapor transmission rate from 1e-15 $m^3$ m/($m^2$ Pa day) to 1e-10_$m^3$ m/($m^2$ Pa day). All individual values and subranges from 1e-15 $m^3$ m/($m^2$ Pa day) to 1e-10_$m^3$ m/($m^2$ Pa day) are included; for example, the barrier material can have a water vapor transmission rate from a lower limit of 1e-15, or 1e-15 $m^3$ m/($m^2$ Pa day) to an upper limit of 1e-10, or 1e-11 $m^3$ m/($m^2$ Pa day). Examples of barrier materials include those available under the trade name SARANEX™, among others.

The barrier material can be connected to the mold, e.g., the barrier material can be secured to the mold via chemical adhesion, mechanical adhesion, material support, and combinations thereof. The barrier material can be located inside the mold and/or outside the mold. One or more embodiments of the present disclosure provide that barrier material may be injected into the mold. For instance, fluid may be injected into the mold, which cures to form the barrier material within the mold.

A number of components of the polyurethane foam composition may be combined, e.g., mixed, prior to being injected into the mold. A number components of the polyurethane foam composition may be uncombined with other components of the polyurethane foam composition prior to being injected into the mold. In other words, all components of the polyurethane foam composition are not required to be combined with one another prior to being injected into the mold.

One or more embodiments of the present disclosure provide that a number of components of the polyurethane foam composition, e.g., polyols, supercritical carbon dioxide, and/or surfactants, among others, may be combined prior to being injected into the mold. This combination may be referred to as a "B" side, which in Europe may be referred to as the "A" side. As the carbon dioxide is in the supercritical state, the number of components may be combined in a vessel that is suitable to maintain a temperature and pressure at which the carbon dioxide can remain in the supercritical state.

One or more embodiments of the present disclosure provide that a number of components of the polyurethane foam composition, e.g., polyisocyanates, can be included in an "A" side, which in Europe may be referred to as the "B" side. The A side and the B side can be combined to provide the isocyanate index discussed herein.

One or more embodiments of the present disclosure provide that the A side and the B side can be combined, e.g., with an injection head, and then, more or less simultaneously, be injected into the mold to be filled. One or more embodiments of the present disclosure provide that reaction injection molding may be utilized.

As the component of the polyurethane foam composition are injected into the mold, foaming and polymerization occurs to form a polyurethane foam. The foaming and/or polymerization can continue until the mold is filled with the polyurethane foam.

As mentioned, the porosity from has a number of desirable properties, which may help to provide the thermal conductivity discussed herein. For instance, utilizing the supercritical carbon dioxide, in contrast to other blowing agents, can help provide that the polyurethane foam has an average pore diameter from 1 micron to 100 microns. All individual values and subranges from 1 micron to 100 microns are included; for example, the polyurethane foam can have an average pore diameter from a lower limit of 1 micron, 2 microns, 2.5 microns, 3 microns, or 3.5 microns to an upper limit of 100 microns, 75 microns, 50 microns, 35 microns, or 25 microns. One or more embodiments of the present disclosure provide that the average pore diameter has a coefficient of variation not greater than 25% For instance, the average pore diameter can have a coefficient of variation 25% or less, 20% or less, 15% or less, or 10% or less.

Embodiments of the present disclosure provide that the polyurethane foam can be an open cell foam. The open cells may be referred to as intercommunicating. The polyurethane foam can have an open cell percentage of 90% or greater, e.g., an open cell percentage from 90% to 100%. For example, the polyurethane foam can have an open cell percentage from a lower limit of 90%, 95%, 96%, or 97% to an upper limit of 100%, 99.85%, 99.75% or 99.5%.

Embodiments of the present disclosure provide that the polyurethane foam can have a porosity from 80% to 98%. All individual values and subranges from 80% to 98% are included; for example, the polyurethane foam can have a porosity from a lower limit of 80%, 82.5%, or 85% to an upper limit of 98%, 97%, or 95%.

Embodiments of the present disclosure provide that a vacuum may be applied to the mold to provide a pressure from 1 millibar to 500 millibar. All individual values and subranges from 1 millibar to 500 millibar are included; for example, the vacuum may be applied to the mold to provide a pressure from a lower limit of 1 millibar, 5 millibar, 10 millibar, or 50 millibar to an upper limit of 500 millibar, 450 millibar, 400 millibar, or 350 millibar. The vacuum may be applied after the curing of the polyurethane foam composition within the mold to provide a desired pressure within the mold.

The insulative apparatus as disclosed herein can be formed by applying the vacuum to the mold having the polyurethane foam therein and thereafter sealing the barrier material. The pressure within the mold, which is achieved by application of the vacuum, can be maintained by the sealed barrier material, e.g., for an operational lifetime of the insulative apparatus. The insulative apparatus disclosed herein can be utilized for a variety of applications, such as in appliance insulating walls for uses such as, refrigerators, freezers, and hot water storage tanks, as well as building applications, among others.

Application of the vacuum can provide that fluid within the sealed mold, i.e. fluid within the insulative apparatus such as carbon dioxide, can have a Knudsen number from 0.85 to 1.15. All individual values and subranges from 0.85 to 1.15 are included; for example, fluid within the sealed mold can have a Knudsen number from a lower limit of 0.85, 0.90, or 0.95 to an upper limit of 1.15, 1.00, or 1.05.

As mentioned, the insulative apparatus components, e.g., the polyurethane foam and the pressure achieved by the vacuum application, can advantageously provide a synergism to achieve the thermal conductivity discussed herein.

EXAMPLES

In the Examples, various terms and designations for materials are used including, for instance, the materials included in Table 1. For Table 1, F indicates the functionality and OH no indicates the hydroxyl number.

TABLE 1

| Material | Trade Name | Material characteristic(s) | Material supplier |
| --- | --- | --- | --- |
| Polyol | VORANOL ™ RN 482 (RN 482) | F = 6; OH n° 482, PO based | The Dow Chemical Company (TDCC) |
| Polyol | VORANOL ™ RN 490 (RN 490) | F = 4.5; OH n° 640, PO based | TDCC |

TABLE 1-continued

| Material | Trade Name | Material characteristic(s) | Material supplier |
|---|---|---|---|
| Polyol | TERCAROL 5903 (T 5903) | F = 4; OH n° 440, PO based | TDCC |
| Polyol | VORATEC ™ SD301 (SD 301) | F = 3; OH n° 160, PO based | TDCC |
| Polyol | VORANOL ™ CP 260 (CP 260) | F = 3; OH n° 650, PO based | TDCC |
| Polyol | VORANOL ™ RH 360 (RH 360) | F = 4.9, OH n° 360, PO based | TDCC |
| Polyol | VORANOL ™ CP 450 (CP 450) | F = 3, OH n° 370, PO based | TDCC |
| Catalyst | POLYCAT ®-5 (PC-5) | N,N,N,N,N-Pentamethyldiethylenetriamine | Air product |
| Catalyst | POLYCAT ®-8 (PC-8) | N,N-Dimethylcyclohexylamine | Air product |
| Catalyst | POLYCAT ®-41 (PC-41) | Dimethylaminopropyl-hexahydrotriazine,N,N',N" | Air product |
| Surfactant | AK 8850 | Silicone surfactant | Dearmate |
| Surfactant | L 6164 | Silicone surfactant | Momentive |
| Surfactant | L 6165 | Silicone surfactant | Momentive |
| Cell opener | TEGO ™-501 | Silicone surfactant | Evonik |
| Cell opener | AK 9903 | Silicone surfactant | Dearmate |
| Isocyanate | VORATEC ™ SD 100 | PMDI | TDCC |
| Isocyanate | PAPI ™-135C | PMDI | TDCC |
| Carbon Dioxide | | | Air product |
| Barrier Material | SARANEX ™ | | TDCC |

Example 1, a method of forming an insulative apparatus, was performed as follows. Polyol A [SD301 (47.55 grams), CP260 (38 grams), T5903 (9.5 grams)], catalyst [PC-41 (0.57 grams), PC-5 (0.48 grams), PC-8 (1.9 grams)] and surfactant L 6164 (2 grams) were added to a pressure reactor (100 ml Pan reactor) that was maintained at 10 MPa and 40° C. thereafter. Supercritical carbon dioxide was injected into the pressure reactor to saturation of the contents of the pressure reactor. The temperature and the pressure inside the pressure reactor were maintained for 30 minutes to facilitate the carbon dioxide saturation while the contents of the pressure reactor were stirred. A high pressure homogenizer was used to form an emulsion with the contents of the pressure reactor; the emulsion had droplets with diameters ranging from approximately 5 nanometers to approximately 300 nanometers. A polyurethane foam composition was formed when PAPI™-135C isocyanate (101 grams) was added to the pressure reactor and the contents of the pressure reactor were stirred for approximately 1 minute. After approximately 8 minutes, the polyurethane foam composition, having a viscosity of approximately 0.5 Pa-s, was injected into a mold (20 cm×20 cm×2.5 cm) that was internally lined with a barrier material (SARANEX™ NEX 23P). The polyurethane foam composition cured to form a polyurethane foam completely filling the mold cavity; a vacuum was applied to achieve a mold cavity pressure of 10 millibar and the barrier material was sealed to provide Example 2, an insulative apparatus.

Comparative Example A, a polyurethane foam, was formed with components described in Table 2.

TABLE 2

| Material | Trade Name | Weight (%) |
|---|---|---|
| Polyol | VORANOL ™ RN 482 (RN 482) | 27.54 |
| Polyol | VORANOL ™ RN 490 (RN 490) | 27.54 |
| Polyol | TERCAROL 5903 (T 5903) | 27.54 |
| Polyol | VORATEC ™ SD301 (SD 301) | 9.18 |
| Silicone surfactant | TEGOSTAB ® B 8523 | 1.85 |
| Catalyst | POLYCAT ®-5 (PC-5) | 0.46 |
| Catalyst | POLYCAT ®-8 (PC-8) | 1.37 |
| Catalyst | POLYCAT ®-41 (PC-41) | 0.65 |
| Water | | 2.02 |
| Cell Opener | TEGO ™ 501 | 1.85 |
| | (Total Weight % of formulated polyol) | 100.00 |
| Expansion agent | HCFC-141B (available from Chemours) | 12 (based on formulated polyol) |
| Isocyanate | Papi-135C | 147 (based on formulated polyol) |

Formulated polyol with composition shown above were added to a container and mixed with an impeller at 3000 rpm for approximately 1 minute; after which the contents of the container were left to equilibrate for approximately 1 hour. Isocyanate with composition shown above was added to the container and the contents were mixed with an impeller at 3000 rpm for approximately 10 seconds. The contents of the container were poured into a mold (30 cm×20 cm×5 cm) and cured to form Comparative Example A. Comparative Example A was cut (20 cm×20 cm×2.5 cm) and thermal conductivity 23° C. (ASTM E1225) was determined with a EKO Heat Flow Meter (HC-074), a fixed lower plate temperature of 36° C., and an upper plate temperature of 10° C. For Example 2 and Comparative Example A: average pore diameter was determined by Scanning Electron Microscopy with Image Pro Plus software; open cell percentage was determined by Micromeritics Accupyc II 1340 according to ASTM D2856; and porosity was determined by ASTM D792-00 involving weighing polymer foam in water using a sinker; thermal conductivity was measured according to ISO 12939-01, using a heat flow meter instrument HC-074 by EKO Instrument Trading Co., Ltd. The results are indicated in Table 3.

TABLE 3

|  | Example 2 | Comparative Example A |
| --- | --- | --- |
| Average pore diameter (micrometers) | 9 | 300 |
| Open cell percentage | 95 | 98 |
| Porosity | 90 | 95 |
| Mold cavity pressure (millibar) | 2 | 1013 |
| Thermal conductivity (milliWatts/meter-degree Kelvin) | 13.0 | 32.0 |

The data in Table 3 show that Example 2, has a desirable thermal conductivity, as discussed herein. Additionally, Example 2 can advantageously provide improved manufacturability, as compared to other insulating panels.

The invention claimed is:

1. A method of forming an insulative apparatus, comprising:
   connecting a barrier material to a mold;
   injecting a polyurethane foam composition into the mold, wherein the polyurethane foam composition includes a polyol, an isocyanate, and supercritical carbon dioxide;
   curing the polyurethane foam composition to form a polyurethane foam, wherein the polyurethane foam has an open cell percentage of 95% or greater; and
   applying a vacuum to the mold to provide a pressure from 1 millibar to 500 millibar.

2. The method of claim 1, wherein the polyurethane foam has an average pore diameter from 2 microns to 100 microns.

3. The method of claim 1, wherein the polyol comprises a formulated polyol.

4. The method of claim 1, wherein the isocyanate comprises isocyanic acid polymethylenepolyphenylene ester.

5. The method of claim 1, wherein the barrier material is sealed to help maintain a desired pressure within the mold.

6. The method of claim 1, further comprising combining the polyol, the isocyanate, and the supercritical carbon dioxide in a pressure vessel.

7. The method of claim 6, wherein the pressure vessel has a pressure greater than 100 bar.

8. A method of forming an insulative apparatus, comprising:
   connecting a barrier material to a mold;
   injecting a polyurethane foam composition into the mold, wherein the polyurethane foam composition includes a polyol, an isocyanate, and supercritical carbon dioxide;
   curing the polyurethane foam composition to form a polyurethane foam, wherein the polyurethane foam has a porosity from 80% to 98%; and
   applying a vacuum to the mold to provide a pressure from 1 millibar to 500 millibar.

9. The method of claim 8, wherein the polyurethane foam has an average pore diameter from 2 microns to 100 microns.

10. The method of claim 8, wherein the polyol comprises a formulated polyol.

11. The method of claim 8, wherein the isocyanate comprises isocyanic acid polymethylenepolyphenylene ester.

* * * * *